United States Patent
Epshetsky (10) Patent No.: US 9,212,748 B2
(45) Date of Patent: Dec. 15, 2015

(54) FLOATING WEAR SLEEVE ASSEMBLY FOR SHAFT SEALS

(75) Inventor: Yefim Epshetsky, Schaumburg, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 13/395,091

(22) PCT Filed: Sep. 7, 2010

(86) PCT No.: PCT/US2010/048003
§ 371 (c)(1),
(2), (4) Date: May 11, 2012

(87) PCT Pub. No.: WO2011/031677
PCT Pub. Date: Mar. 17, 2011

(65) Prior Publication Data
US 2012/0217706 A1    Aug. 30, 2012

Related U.S. Application Data

(60) Provisional application No. 61/276,100, filed on Sep. 8, 2009.

(51) Int. Cl.
*F16J 15/32* (2006.01)

(52) U.S. Cl.
CPC .......... *F16J 15/3264* (2013.01); *F16J 15/3224* (2013.01)

(58) Field of Classification Search
USPC .......................... 277/500, 351, 551, 571, 585
See application file for complete search history.

(56) References Cited

U.S. PATENT DOCUMENTS

| | | | | |
|---|---|---|---|---|
| 3,086,781 A * | 4/1963 | Hudson et al. | | 277/568 |
| 3,214,180 A | 10/1965 | Hudson et al. | | |
| 3,275,333 A * | 9/1966 | Scott et al. | | 277/565 |
| 3,561,770 A * | 2/1971 | Corsi et al. | | 277/562 |
| 4,436,317 A * | 3/1984 | Schmitt | | 277/568 |
| 4,921,260 A * | 5/1990 | Takenaka et al. | | 277/571 |
| 5,082,294 A * | 1/1992 | Toth et al. | | 277/551 |
| 5,085,444 A * | 2/1992 | Murakami et al. | | 277/503 |
| 5,354,071 A * | 10/1994 | McClure | | 277/571 |
| 5,582,412 A * | 12/1996 | Sabo Filho | | 277/565 |
| 6,386,546 B1 * | 5/2002 | Fedorovich | | 277/351 |
| 6,679,678 B2 | 1/2004 | Giesler et al. | | |
| 6,692,007 B2 * | 2/2004 | Oldenburg | | 277/353 |
| 7,108,267 B2 * | 9/2006 | Oldenburg | | 277/571 |
| 7,159,871 B2 * | 1/2007 | Oldenburg | | 277/353 |
| 7,658,386 B2 * | 2/2010 | Oldenburg | | 277/353 |
| 7,959,158 B2 * | 6/2011 | Sanada | | 277/551 |
| 2007/0057472 A1 | 3/2007 | Hatch | | |
| 2007/0090605 A1 | 4/2007 | Grimanis et al. | | |

* cited by examiner

Primary Examiner — Kristina Fulton
Assistant Examiner — Eugene G Byrd
(74) *Attorney, Agent, or Firm* — Mark Ussai; SKF USA Inc. Patent Dept.

(57) ABSTRACT

A wear sleeve assembly for a seal on a shaft includes a sleeve having inner and outer circumferential surfaces, the outer surface being engageable by a seal inner surface at a contact location to prevent fluid flow between the seal inner surface and the sleeve outer surface. The sleeve inner surface defines a bore sized to receive a portion of the shaft with clearance. A coupler is configured to connect the sleeve with the shaft and provides a clearance space between the sleeve inner surface and a shaft outer surface at about the seal contact location. Thereby, the sleeve is adjustably positionable relative to the shaft so that the sleeve remains generally centered within the seal as the sleeve and shaft rotate about the axis. The coupler preferably includes an annular body with first and second axially-spaced, relatively displaceable sections for displacing the sleeve relative to the shaft.

18 Claims, 8 Drawing Sheets

FLOATING WEAR SLEEVE ASSEMBLY FOR SHAFT SEALS

CROSS REFERENCE

This application is the U.S. national stage of International Application No. PCT/US2010/048003 filed on Sep. 7, 2010, which claims the benefit of U.S. Provisional Patent Application No. 61/276,100, filed on Sep. 8, 2009.

The present invention relates to seal assemblies, and more particularly to wear sleeves for seal assemblies for sealing about rotating shafts.

Seal assemblies, such as lip seals, typically include a seal member having an inner surface that seals against the outer surface of a shaft. After a period of use, the outer surface of the shaft (and the inner surface of the seal) wears away to the extent that the seal member inner no longer seats properly against the shaft outer surface. In such cases, either the shaft and/or the seal are replaced, or more preferably, a device known as a "wear sleeve" is mounted to the shaft at the sealing location. Such a sleeve increases the shaft outside diameter in the vicinity of the seal to thereby restore proper sealing.

Although such a wear sleeve is a generally satisfactory solution to the problem of shaft (and seal) wear, care must be taken when installing the sleeve as known wear sleeves are typically thin-walled and press-fitted onto the shaft. If the sleeve inside diameter is too small, the sleeve could become fractured or "split" during assembly. Also, if there is a misalignment between the center of the seal member and the center of the shaft (i.e., the axis of rotation), the sleeve could either become "squeezed" between the seal and shaft, and possibly split, or may not sufficiently occupy the space between the shaft outer surface and sleeve inner surface such that leakage occurs.

SUMMARY OF THE INVENTION

In one aspect, the present invention is a wear sleeve assembly of a seal for a shaft, the shaft having an outer surface and being rotatable about an axis and the seal including a seal member with an inner circumferential surface. The wear sleeve assembly comprises a sleeve having inner and outer circumferential surfaces, the sleeve outer surface being engageable by the seal inner circumferential surface at about a contact location with respect to the axis so as to substantially prevent fluid flow between the seal inner surface and sleeve outer surface. The sleeve inner surface defines a bore sized to receive a portion of the shaft with clearance. Further, a coupler is configured to connect the sleeve with the shaft, so as to provide a clearance space between the sleeve inner surface and the shaft outer surface at about the seal contact location. As such, the sleeve is adjustably positionable with respect to the shaft so that the sleeve remains generally centered within the seal as the sleeve and shaft rotate about the axis.

In another aspect, the present invention is again a wear sleeve assembly of a seal for a shaft, the shaft having an outer surface and being rotatable about an axis, the seal including a seal member with an inner circumferential surface. The wear sleeve assembly comprises a sleeve having inner and outer circumferential surfaces, the sleeve outer surface being engageable by the seal inner circumferential surface at about a contact location with respect to the axis so as to substantially prevent fluid flow between the seal inner surface and sleeve outer surface. The sleeve inner surface defines a bore sized to receive a portion of the shaft with clearance. Further, a coupler is configured to connect the sleeve with the shaft so as to provide a clearance space between the sleeve inner surface and the shaft outer surface at about the seal contact location such that the sleeve is adjustably positionable with respect to the shaft. Preferably, the coupler includes a generally annular body with a first section including a bore configured to receive a portion of the shaft and a second section spaced axially from the first section and configured to engage with the sleeve. At least a portion of the coupler body is deflectable to displace the coupler second section relative to the coupler first section so as to displace the sleeve relative to the shaft.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. As used herein, the words "connected" or "coupled" are each intended to include direct connections between two members without any other members interposed therebetween, indirect connections between members in which one or more other members are interposed therebetween, and operative connections between two or more members. The terminology includes the words specifically mentioned above, derivatives thereof, and words of similar import.

Referring to the drawings in detail, wherein like numbers are used to indicate like elements throughout, there is shown in FIGS. 1-12 a "floating" wear sleeve assembly 10 of a seal 1 for a shaft 2. The shaft 2 has an outer surface 2a and is rotatable about an axis 3 and the seal 1 includes a seal member 4 with an inner circumferential surface 5 and a geometric center $C_S$. The wear sleeve assembly 10 comprises a sleeve 12 engageable with the seal member 4 and a coupler 14 for connecting the sleeve 12 with the shaft 2. The sleeve 12 has inner and outer circumferential surfaces 16, 17, respectively, opposing axial ends 12a, 12b, and a centerline 13 extending between the ends 12a, 12b. The sleeve outer surface 17 is engageable by the seal inner circumferential surface 5 at about a contact location $L_{SC}$ with respect to the shaft axis 3 so as to substantially prevent fluid flow between the seal inner surface 5 and sleeve outer surface 17. It must be noted that the circumferential contact location $L_{SC}$ of the seal member 4 on the sleeve 12 is indicated in the drawings by a line representing a plane through the geometric center of the contact location/region. Further, the sleeve inner surface 16 defines a bore 18 sized to receive a portion of the shaft 2 with clearance.

Figure 1:
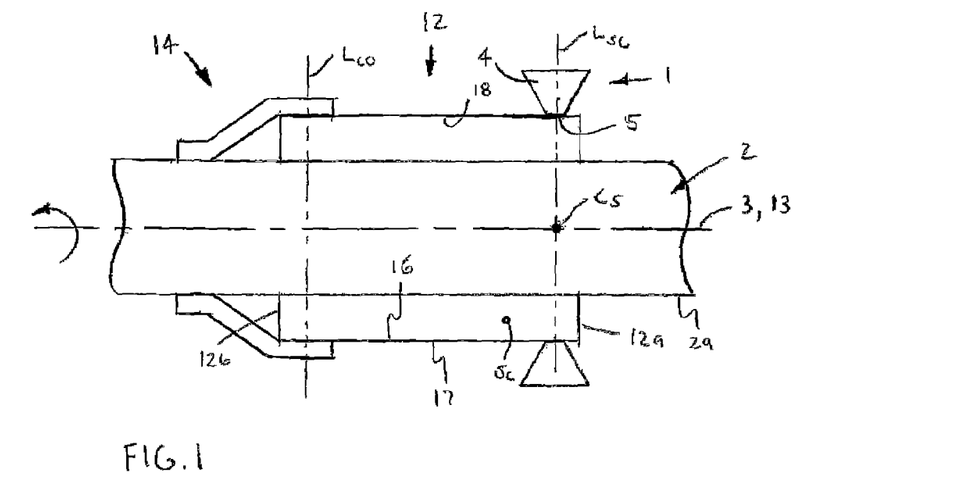
FIG. 1 is more diagrammatic view of a wear sleeve assembly in accordance with the present invention, shown mounted to a shaft and engaged by a seal aligned with the shaft.
Figure 2:
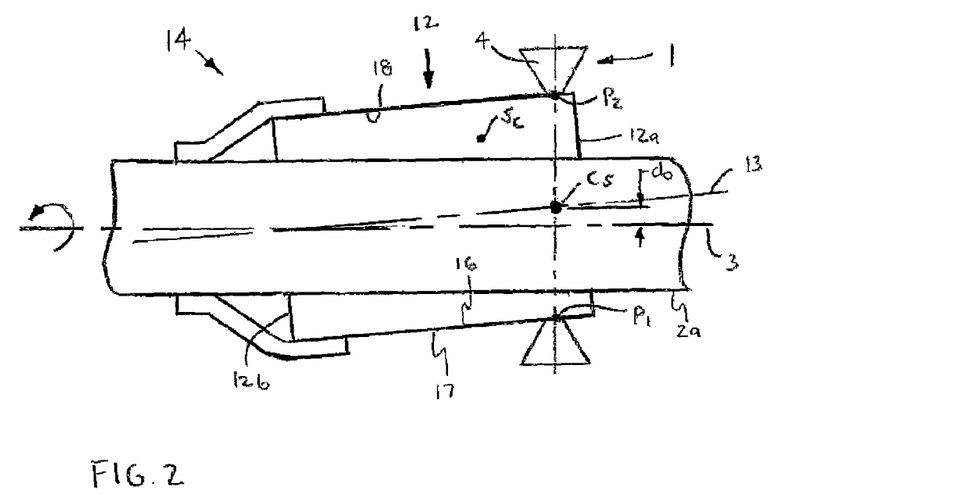
FIG. 2 is another view of the wear sleeve assembly of FIG. 1, shown engaged by a seal offset from the shaft.
Figure 3:
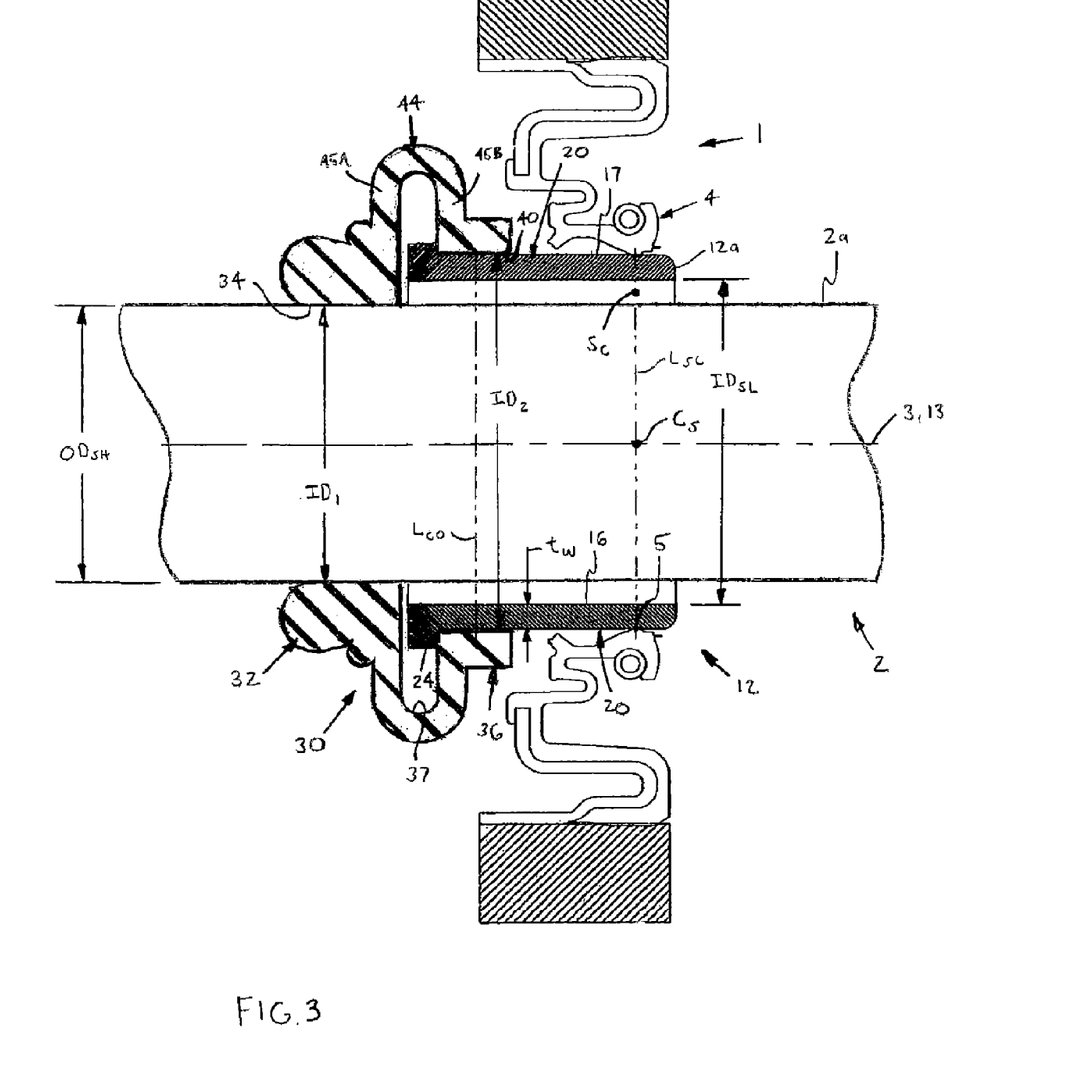
FIG. 3 is an axial cross-sectional view of a first preferred construction of the wear sleeve assembly.
Figure 4:
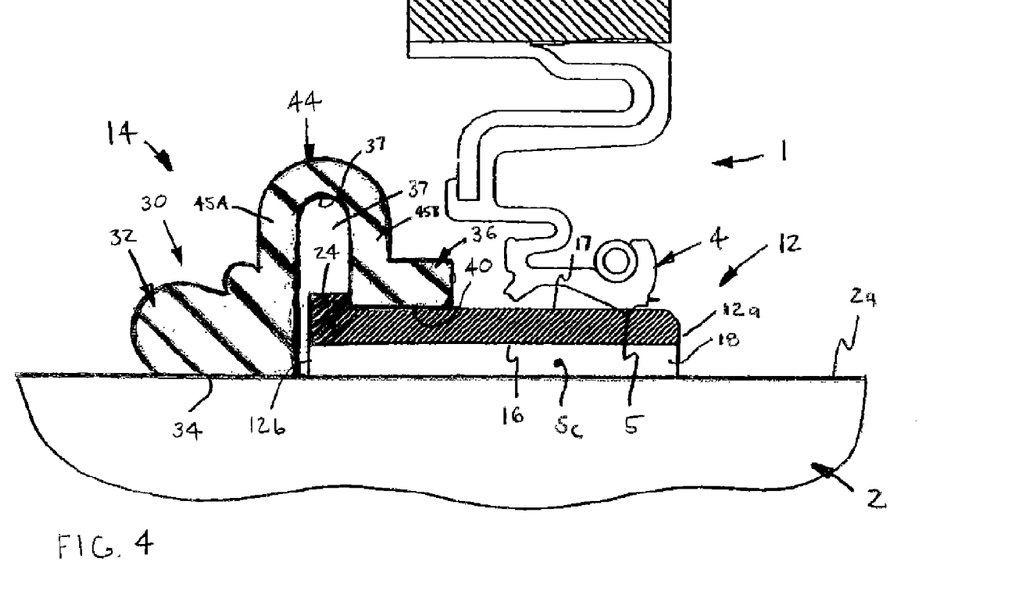
FIG. 4 is an enlarged, partly broken-away view of the wear sleeve assembly of FIG. 3.
Figure 5:
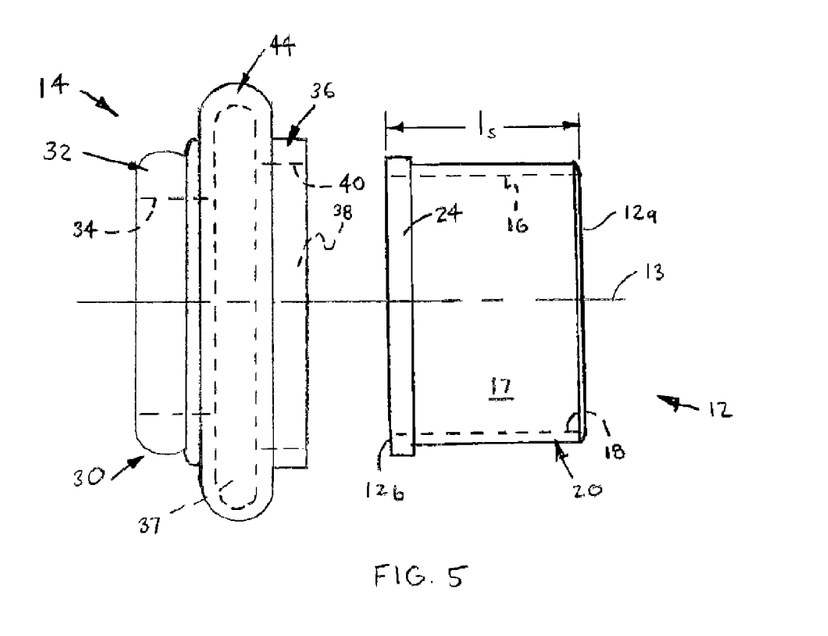
FIG. 5 is an exploded, side plan view of the wear sleeve assembly of FIG. 3.

Furthermore, the coupler 14 is configured to connect the sleeve 12 with the shaft 2 so as to provide a clearance space $S_C$ between the sleeve inner surface 16 and the shaft outer surface 2a at about (i.e., in the region of) the seal contact location $L_{SC}$. As such, the sleeve 12 is freely adjustably positionable with respect to the shaft 2 so that the sleeve 12 remains generally centered within the seal 1 as the sleeve 12 and shaft 2 rotate about the shaft axis 3. More specifically, the coupler 14 is configured such that the sleeve 12 displaces relative to the shaft 2, as the shaft 2 and sleeve 12 rotate about the shaft axis 3, so that the sleeve centerline 13 remains generally extending through the seal member center $C_S$ even when the shaft axis 3 is spaced from the seal member center $C_S$ by an "offset" distance $d_O$ (i.e., seal 1 not centered about shaft 2). That is, as the shaft 2 rotates about the shaft axis 3 in such an offset arrangement, the sleeve 12 displaces generally radially such that all points on the sleeve 12 in contact with the seal 1 continuously move between a most proximal position $P_1$ with respect to the shaft 2 and a most distal position $P_2$ with respect to the shaft 2, and vice versa, while the sleeve centerline 13 remains generally intersecting the seal center $C_S$, as indicated in FIG. 2. However, when the shaft 3 is centered within the seal member 4, such that the shaft axis 3 (and sleeve axis 13) extends through the seal member center $C_S$, the sleeve 12 and shaft 2 rotate about the shaft axis 3 with substantially no movement of the sleeve 12 relative to the shaft 2, as depicted in FIG. 1.

Thus, by providing the clearance space $S_C$ at the contact location $L_{SC}$ with the seal 1, the sleeve 12 is movable to adjust for any misalignment with between the shaft 2 and the seal member 4. To provide both the clearance space $S_C$ at the seal contact location $L_{SC}$ and a sufficient amount of radial movement of the sleeve 12, the coupler 14 is preferably connected with the sleeve 12 at a coupling location $L_{CO}$ with respect to the shaft axis 3, which is spaced axially from the seal contact location $L_{SC}$. Most preferably, the sealing contact location $L_{SC}$ is proximal to one axial end 12a of the sleeve 12 and the coupling location $L_{CO}$ is proximal to the other sleeve axial end 12b, such that radial movement of the sleeve 12 minimizes the amount of deflection of the coupler 14. In other words, by spacing the coupling location $L_{CO}$ from the seal contact location $L_{SC}$, a lesser amount of deflection of the coupler 14 is required to permit the necessary amount of radial movement of the sleeve 12 within the seal 1 and relative to the shaft 2.

Preferably, the coupler 14 is configured to connect the sleeve 12 with the shaft 3 in such a manner that circumferential stresses (i.e., hoop sheer) within the sleeve 12 have a value of substantially zero. Such a low or "no stress" condition within the sleeve 12 is realized by providing the clearance space $S_C$ throughout the entire axial length $l_S$ of the sleeve 12, as shown in FIGS. 1-4, 6, 7, 9 and 10. That is, when the sleeve 12 is mounted directly on the shaft (no clearance space $S_C$), such as by means of a press-fit, or is attached to the shaft 2 by means of device which is at least partially disposed between the shaft 2 and the sleeve 12 (see, e.g., FIG. 12), pressure may be directed outwardly on the sleeve 12, generating radial shear and circumferential or "hoop" sheer stresses. More specifically, in the case of a directly press-fitted sleeve, such stresses are always present, and in the case of an intervening connective member, such stresses are at least present (and increased) when the connective member becomes compressed during movement of the sleeve 12 to accommodate for misalignment of the shaft 2 and the seal 1. Thus, by having the clearance space $S_C$ extend along substantially the entire axial length $l_S$, the sleeve 12 is both adjustably positionable and subjected to only minimal stress, therefor enabling the use of a sleeve 12 formed with a reduced wall thickness and/or of more brittle materials, as discussed in further detail below.

Furthermore, the coupler 14 is also preferably configured to substantially seal the clearance space $S_C$ between the sleeve 12 and the shaft 2. More specifically, although a quantity of fluid may flow into the sleeve 12 through one axial end, e.g., end 12a, and into the clearance space $S_C$ between the sleeve 12 and shaft 2, the coupler 14 encloses the other sleeve end, e.g., end 12b, so that the fluid is contained within the clearance space $S_C$.

Referring now to FIGS. 3-11, the sleeve 12 preferably includes a substantially circular, generally tubular body 20 having a substantially constant inside diameter $ID_{SL}$ along the sleeve axis 13 and a wall thickness $t_W$, which is preferably substantially constant along the sleeve axial length $l_S$. Due to the minimization of stresses on the sleeve 12 as discussed above, the sleeve 12 is preferably constructed with a relatively minimal wall thickness $t_W$. For example, the thickness $t_W$ may have a value within a range of about twelve thousands of an inch (0.012") and one hundred twenty thousands of an inch (0.120"). Also due to the minimization of stresses, the sleeve 12 may be fabricated of variety of less ductile, or more brittle, materials, such as aluminum, a ceramic material, a polymeric material, etc., but may be formed of a more conventional material for such applications, such as for example, a low carbon steel.

Figure 9:
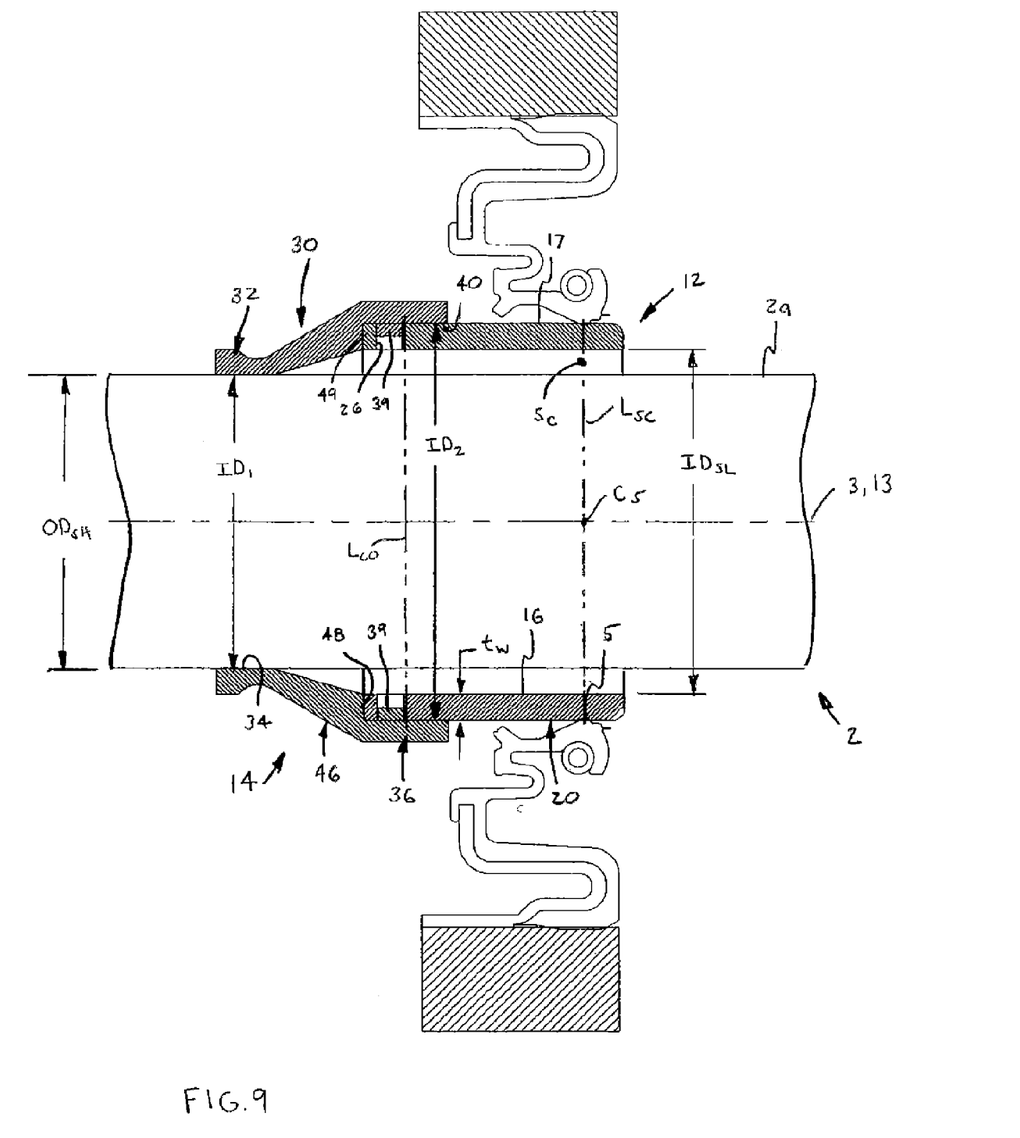
FIG. 9 is an axial cross-sectional view of a third preferred construction of the wear sleeve assembly.
Figure 10:
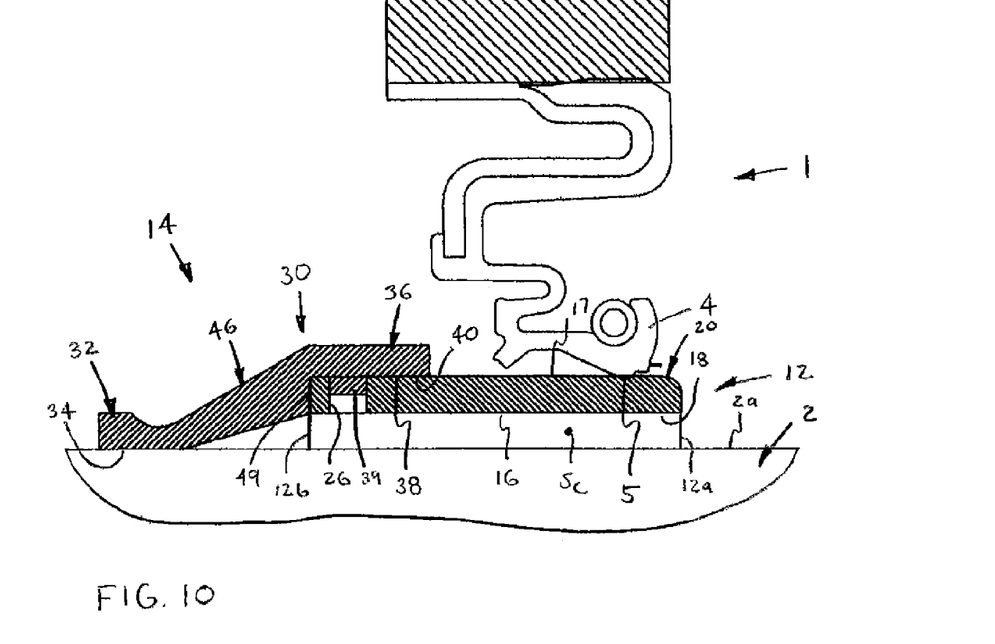
FIG. 10 is an enlarged, partly broken-away view of the wear sleeve assembly of FIG. 9.
Figure 11:
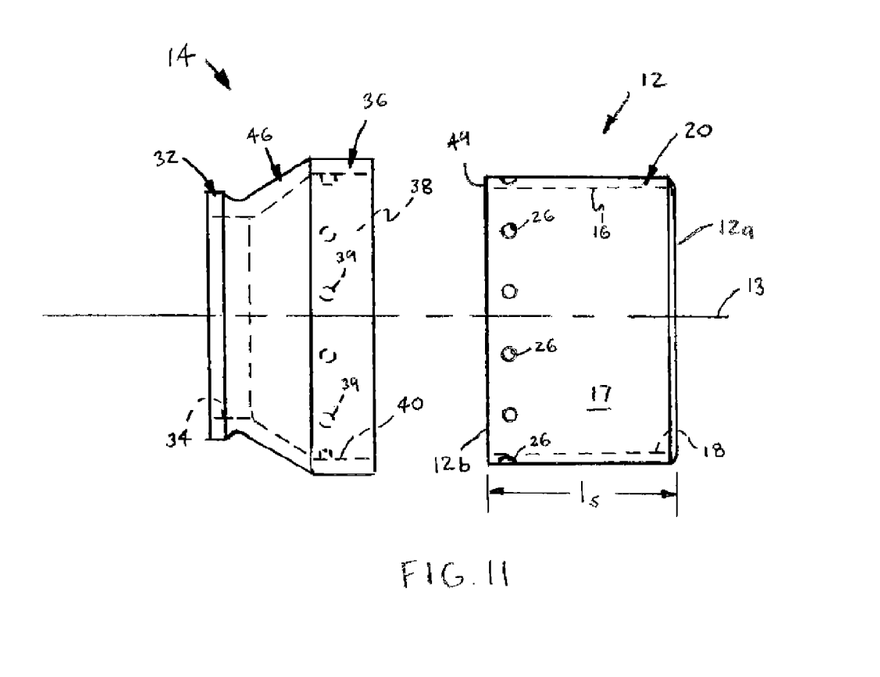
FIG. 11 is an exploded, side plan view of the wear sleeve assembly of FIG. 9.

Further, in certain constructions, the sleeve 12 includes an annular shoulder 24 extending radially outwardly from the sleeve outer circumferential surface 17, and preferably located adjacent to the sleeve end 12b proximal to the coupling location $L_{CO}$, as shown in FIGS. 3-8. The shoulder 24 is receivable within a groove 37 (described below) of the coupler 14 so as to prevent axial displacement of the sleeve 12, as discussed below. In an alternative construction or version, the sleeve 12 is formed without a shoulder and instead includes one or more cavities 26, preferably formed as through-holes, each extending radially between the sleeve inner and outer surfaces 16, 17, as shown in FIGS. 9-11. Each through-hole 26 is configured to receive a separate projection 39 of the coupler 14 so as to prevent both axial and angular displacement of the sleeve 12 relative to the coupler 14, as also discussed below.

Referring to FIGS. 1-11, the coupler 14 preferably includes a generally annular body 30 with a first section 32 including a bore 34 configured to receive a portion of the shaft 2 and a second section 36 spaced axially from the first section 32. The coupler second section 36 is configured to engage with the sleeve 12 so as to thereby connect the sleeve 12 with the shaft 2. Preferably, the coupler second section 36 includes either an inner circumferential surface 38 defining a bore 40 configured to receive one axial end 12b of the sleeve 12 (FIGS. 1-11) or an outer circumferential surface defining a plug disposeable within the end 12b of the sleeve 12 (structure not depicted). Further, at least a portion of the coupler body 30 is deflectable to displace the coupler second section 36 relative to the coupler first section 32, so as to thereby displace the sleeve 12 relative to the shaft 2, as is also discussed in detail below. Preferably, the coupler first and second sections 32, 36 are integrally connected such that the coupler 14 is of one-piece construction, but the coupler 14 may alternatively be formed of two or more separate pieces connected by any appropriate means (e.g., an adhesive, welding, fasteners, etc.).

In the preferred embodiments, the coupler second section 36 has the inner circumferential surface 38 defining the bore 40, as discussed above, the bore 40 being sized diametrically larger than the coupler first section bore 34, and thus forming "counter bore" area. Preferably, both bores 34, 40 are sized to frictionally engage with the shaft 2 and sleeve 12, respectively. More specifically, the coupler first section bore 34 has an inside diameter $ID_1$ sized slightly smaller than the shaft outside diameter $OD_{SH}$, such that the coupler 14 is configured to form an interference fit (or friction fit) with the shaft 2. Further, the coupler second section 36 has an inside diameter $ID_2$ sized slightly smaller than the sleeve outside diameter $OD_{SH}$, such that the coupler 14 is also configured to form an interference/friction fit with the sleeve 12, the second inside diameter $ID_1$ obviously being larger than the first inside diameter $ID_1$. Also, the coupler 14 preferably includes a radially-outwardly extending annular groove 37 defined generally between the coupler first and second sections 32, 36 and configured to receive the preferred sleeve shoulder 24 to "lock" the sleeve 12 within the coupler 14, thereby preventing relative axial displacement of the sleeve 12 and the coupler 14, except as discussed below.

Furthermore, the coupler 14 is preferably fabricated of an elastomeric material (e.g., natural or synthetic rubber) such that the coupler first section bore 24 is expandable to separately frictionally engage with a plurality of shafts 2 of various outside diameters $OD_{SH}$; i.e., each shaft 2 has an outside diameter $OD_{SH}$ with a value different than the value of the outside diameter $OD_{SH}$ of each other shaft 2. By having such a coupler 14 and a sleeve 12 sized to fit with clearance about the shaft 2, a single sleeve assembly 10 is configured for use with a plurality of shafts 2 each having a different outside diameter $OD_{SH}$ within a range of values, with the value of the outside diameter $OD_{SH}$ of each one of the plurality of shafts 2 being different than the value of the outside diameter $OD_{SH}$ of each other one of the plurality of shafts 2. For example, the sleeve assembly 10 may be adapted for use with shafts 2 having outside diameters $OD_{SH}$ ranging between one and one-half inches (1½") and one and three-quarters inches (1¾"). However, the coupler 14 may be formed of any appropriate material, such as for example, steel, aluminum or a rigid polymer, and coupled with the shaft 2 by any appropriate means (e.g., adhesives, welding, a key, etc.).

Referring to FIGS. 3-6, in a first preferred construction, the coupler 14 is formed such that the coupler first and second sections 32, 36 are each generally circular cylindrical and the coupler 14 further includes a generally U-shaped central section 44. The central section 44 extends between and integrally connects the first and second sections 32, 36, such that the coupler 14 is of one-piece construction. Further, the central section 44 has two arm portions 45A, 45B, at least one arm portion 45A, 45B, preferably 45B, is movable relative to the other arm portion 45B, 45A so as to axially and/or radially displace the sleeve 12 relative to the shaft 2, and thus relative to the seal member 4. Also, the groove 37 is defined between the two arms 45A, 45B, such that when the sleeve shoulder 24 is disposed therein, the sleeve 12 remains axially fixed relative to the coupler 14 unless the inner arm 45B is displaced or deflected to permit movement of the sleeve 12. Furthermore, the coupler second section 36 is bendable or deflectable relative to the coupler central section 44 to radially displace the sleeve 12 relative to the shaft 2, for reasons described above.

Referring now to FIGS. 6-11, in a second preferred construction, the coupler 14 is formed such that each of the coupler first and second sections 32, 36 is generally tubular, and the coupler 14 further includes a generally frustaconical central section 46. The central section 46 extends between and integrally connects the first and second sections 32, 36, specifically extending radially outwardly in the direction from the first section 32 toward the second section 36, such that the coupler 14 is of one-piece construction. With this structure, the sleeve 12 is radially displaceable with respect to the shaft 2 either by bending or deflection of the coupler second section 36 relative to the central section 46 or bending/deflection of the central section 46 relative to the first section 32. Further, in this construction, the coupler 14 includes a generally radial stop surface 48 defined generally between the second and central sections 32, 46 and the sleeve 12 has an end surface 49 disposed against the stop surface 48 when the sleeve 12 is connected with the coupler 14. Thereby, the stop surface 49 provides additional structure to prevent axial displacement of the sleeve 12.

Figure 6:
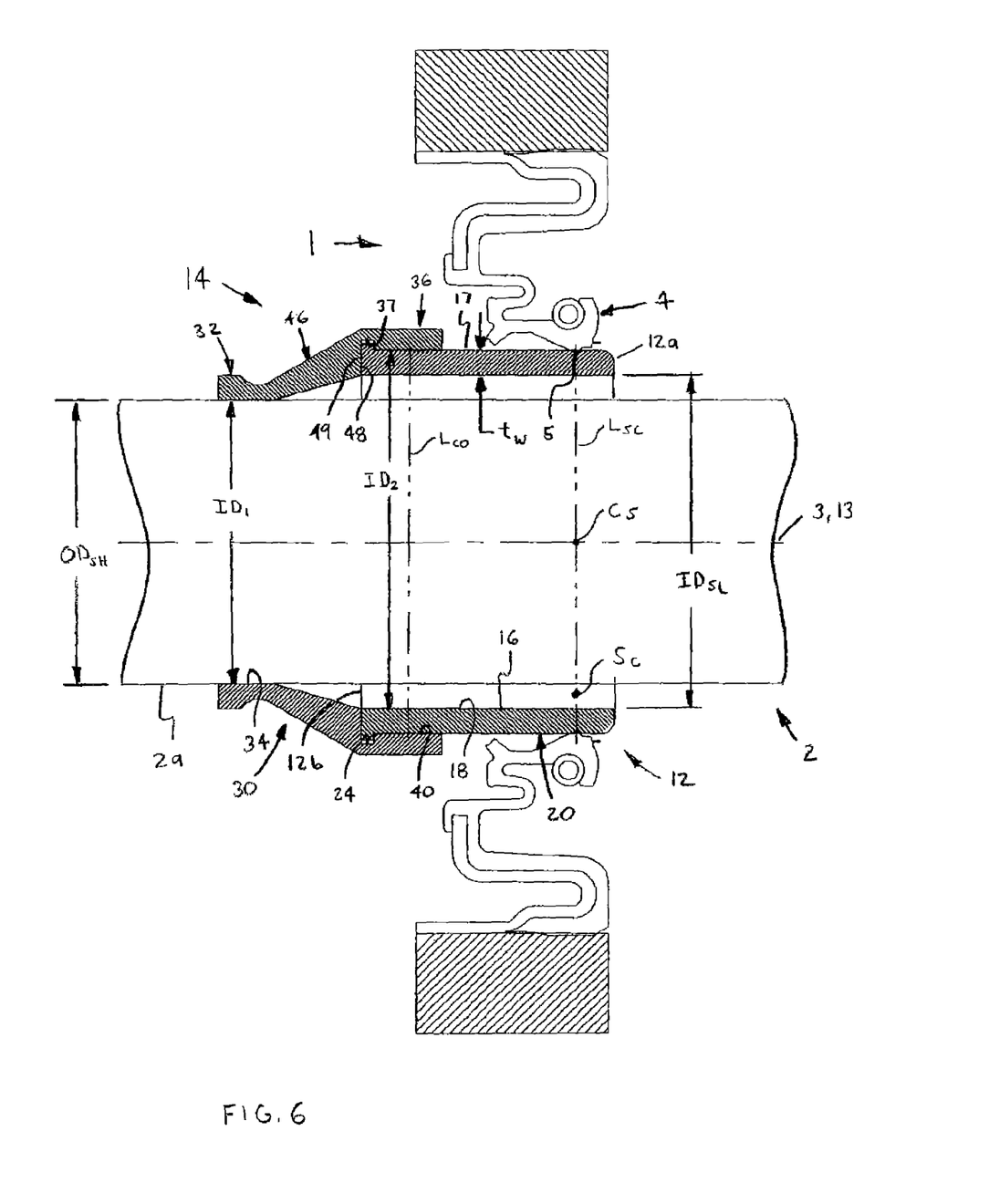
FIG. 6 is an axial cross-sectional view of a second preferred construction of the wear sleeve assembly.
Figure 7:
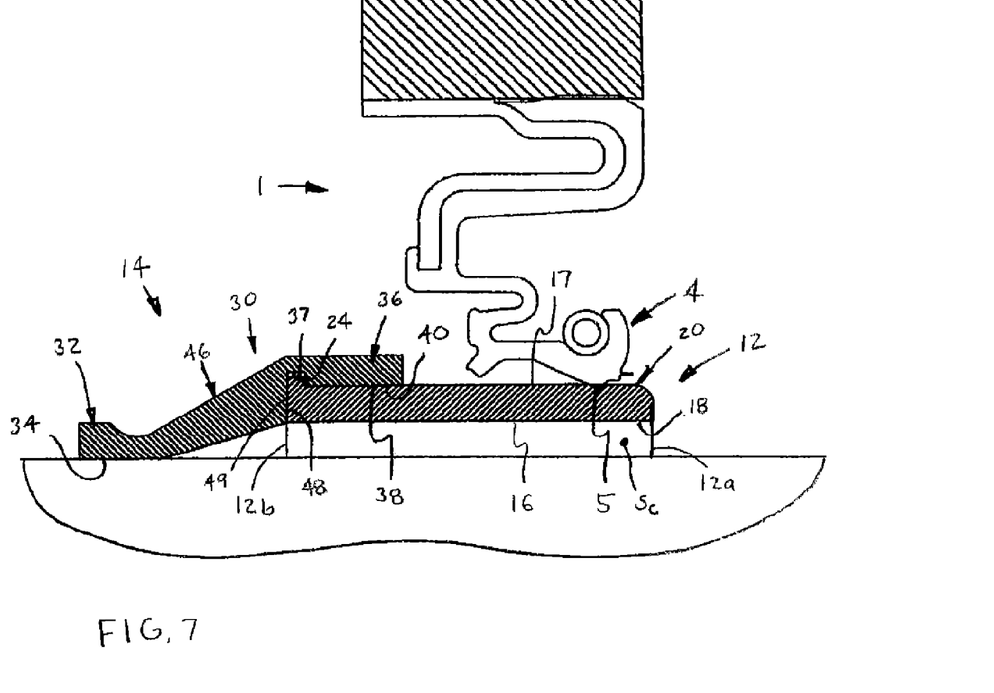
FIG. 7 is an enlarged, partly broken-away view of the wear sleeve assembly of FIG. 6.
Figure 8:
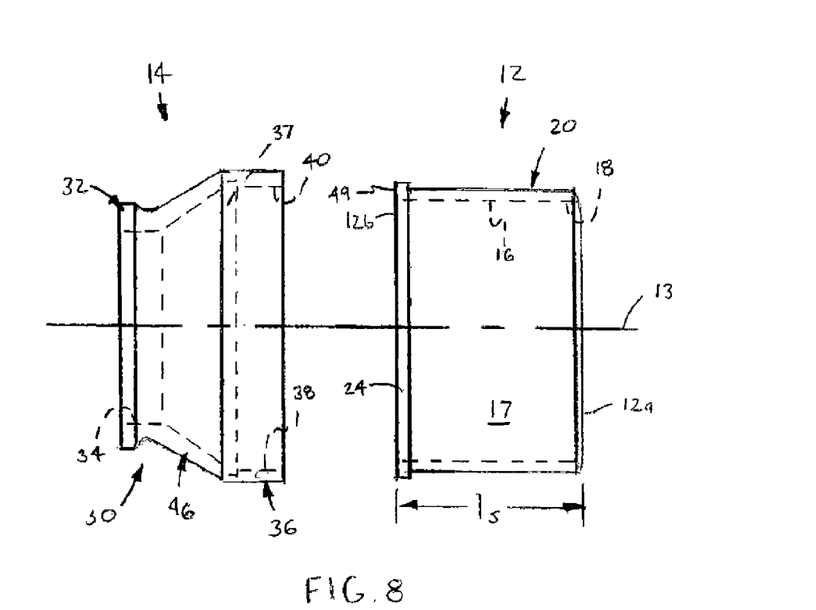
FIG. 8 is an exploded, side plan view of the wear sleeve assembly of FIG. 6.

As shown in FIGS. 6-8, in certain versions of the second construction, the coupler 14 includes the annular groove 37 defined in the coupler second section 36 adjacent to the interface between the second and central sections 36, 46. As discussed above, the groove 37 receives the annular shoulder 24 of the sleeve 12 to at least axially lock the sleeve 12 relative to the coupler 14. In other versions, the second coupler construction includes at least one and preferably a plurality of projections 39 extending radially-inwardly from the coupler second section 36, as depicted in FIGS. 9-11. Each projection 39 is received in a separate cavity 26 of the sleeve 12 so as to prevent both axial and radial displacement of the sleeve 12 relative to the coupler 14.

Figure 12:
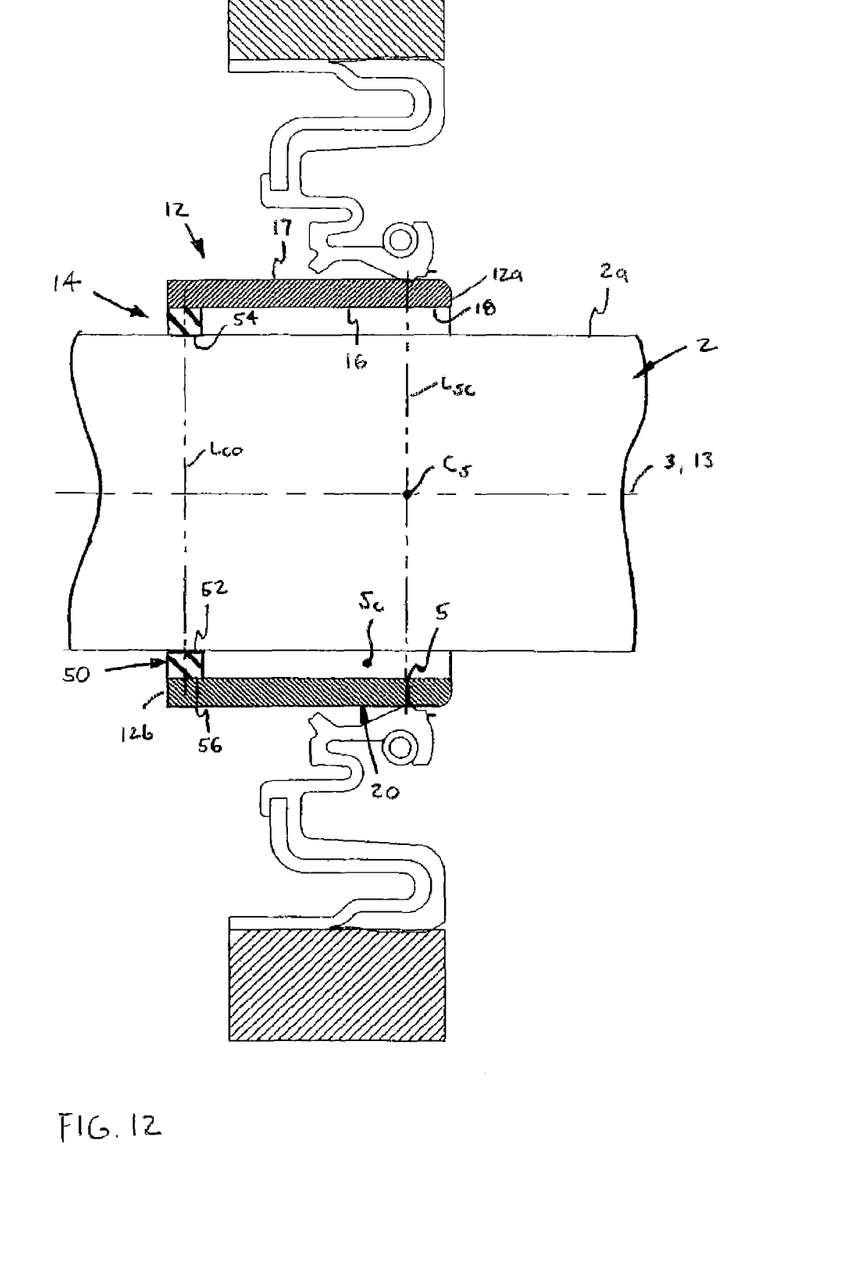
FIG. 12 is an axial cross-sectional view of an alternative construction of the wear sleeve assembly, shown mounted to a shaft.

Referring particularly to FIG. 12, in an alternative embodiment, the coupler 14 includes a generally circular annular body 50 disposeable generally between the shaft 2 and sleeve 12. The body 50 has an inner circumferential surface 52 defining a bore 54 sized to receive a portion of the shaft 2 and an outer surface 56 sized to engage with the sleeve inner surface 16. The bore 54 is preferably sized to frictionally engage with the shaft 2, and the outer surface 56 may be connected with the sleeve by any appropriate means, such as adhesives, one or more projections, a friction fit, etc. Further, the annular body 50 is flexible to permit radial movement or displacement of the sleeve 12 at the seal contact location $L_{SC}$. Although the alternative embodiment provides the capability of sleeve displacement so that the sleeve 12 centers within the seal 1, a potential for increased pressure exerted by the coupler body 50 on the sleeve 12 may require an increased wall thickness $t_W$, and limit the choice of suitable materials, in comparison with the other coupler designs described above.

In any of the above-described constructions, the wear sleeve assembly 10 has a number of advantages over previously known wear sleeve assemblies. As discussed above, the wear sleeve assembly 10 is capable of compensating for misalignment between the seal member 4 and the shaft 2, thereby reducing wear to, and thus prolonging the service life of, each component 2, 4. Also, by having a coupler 14 adapted to receive various shaft diameters and clearance space $S_C$ between the sleeve 12 and shaft 2, the wear sleeve assembly 10 is readily useable with a relatively wide range of shaft sizes as compared with previously known wear sleeve products, and thereby also enabling a single seal 1 to be used with a plurality of shafts 2 having different outside diameters $OD_{SH}$. Further, by providing a sleeve 12 sized to be disposed about a shaft 2 with clearance, stresses applied to the sleeve 12 are substantially less than those to which directly press-fitted sleeves are subjected, thereby enabling the sleeve 12 to be fabricated of relatively less ductile/more brittle materials. Finally, the floating sleeve assembly 10 has reduced interference between the between the seal 1 and sleeve 2, and thus reduced friction therebetween, and is less sensitive to finished running surface dimensions.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A wear sleeve assembly of a seal for a shaft, the shaft having an outer surface and being rotatable about an axis, the seal including a seal member with an inner circumferential surface, the wear sleeve assembly comprising: a sleeve having inner and outer circumferential surfaces and two opposing axial ends, the sleeve outer surface being engageable by the seal inner circumferential surface at about a contact location with respect to the axis so as to substantially prevent fluid flow between the seal inner surface and sleeve outer surface, the sleeve inner surface defining a bore sized to receive a portion of the shaft with clearance; and a coupler configured to connect the sleeve with the shaft so as to provide a clearance space between the sleeve inner surface and the shaft outer surface at about the seal contact location such that the sleeve is adjustably positionable with respect to the shaft so that the sleeve remains generally centered within the seal as the sleeve and shaft rotate about the axis, the coupler being connected with the sleeve at a coupling location with respect to the central axis, the coupling location being spaced axially from the seal contact location such that the seal contact location is disposed generally between one of the two axial ends and the coupling location and the clearance space extends unobstructed axially from the one axial end to at least the coupling location, the coupler including a generally annular body with a first section including a bore configured to receive a portion of the shaft and a second section spaced axially from the first section and configured to engage with the sleeve, at least a portion of the coupler body being deflectable to displace the coupler second section relative to the coupler first section so as to displace the sleeve relative to the shaft.

2. The wear sleeve assembly as recited in claim 1 wherein the seal member has a center, the sleeve has a central axis, and the coupler is configured such that the sleeve displaces relative to the shaft as the shaft and sleeve rotate about the shaft axis so that the sleeve axis remains generally extending through the seal member center when the shaft axis is spaced from the seal member center.

3. The wear sleeve assembly as recited in claim 1 wherein the coupler is configured to connect the sleeve with the shaft such that circumferential stresses within the sleeve have a value of substantially zero.

4. The wear sleeve assembly as recited in claim 1 wherein the sealing contact location is proximal to one axial end and the coupling location is proximal to the other axial end.

5. The wear sleeve assembly as recited in claim 1 wherein the coupler second section includes one of: an inner circumferential surface defining a bore configured to receive an end of the sleeve; and an outer circumferential surface defining a plug disposeable within an end of the sleeve.

6. The wear sleeve assembly as recited in claim 1 wherein the coupler second section has an inner circumferential surface defining a bore configured to receive an axial end of the sleeve, the coupler second section bore being sized diametrically larger than the coupler first section bore.

7. The wear sleeve assembly as recited in claim 6 wherein each of the coupler first and second sections is generally circular cylindrical and the coupler further includes a generally U-shaped central section extending between and integrally connecting the first and second sections, the central section having two arm portions, at least one arm portion being movable relative to the other arm portion so as to displace the sleeve relative to the shaft.

8. The wear sleeve assembly as recited in claim 6 wherein each of the coupler first and second sections is generally tubular and the coupler further includes a generally frusta-conical central section extending between and connecting the first and second sections.

9. The wear sleeve assembly as recited in claim 8 the coupler includes a generally radial stop surface defined generally between the second and central sections and the sleeve has an end surface disposed against the stop surface when the sleeve is connected with the coupler.

10. The wear sleeve assembly as recited in claim 6 wherein the sleeve includes an annular shoulder extending radially outwardly from the sleeve outer circumferential surface and the coupler has an annular groove extending radially outwardly from the second section inner circumferential surface, the coupler groove being configured to receive the sleeve annular shoulder so as to generally prevent axial displacement of the sleeve relative to the coupler.

11. The wear sleeve assembly as recited in claim 6 wherein the coupler includes at least one radially-inwardly extending projection and the sleeve includes at least one cavity configured to receive the at least one projection so as to at least generally prevent angular displacement of the sleeve relative to the coupler.

12. The wear sleeve assembly as recited in claim 1 wherein the coupler first and second sections are integrally connected such that the coupler is of one-piece construction.

13. The wear sleeve assembly as recited in claim 1 wherein the bore of the coupler first section has a diameter sized such that the coupler is configured to frictionally engage with the shaft.

14. The wear sleeve assembly as recited in claim 13 wherein the coupler is fabricated of an elastomeric material such that the coupler second section bore is expandable to separately engage with a plurality of shafts, each shaft having an outside diameter with a value different than the value of the outside diameter of each other shaft.

15. The wear sleeve assembly as recited in claim 1 wherein the sleeve assembly is configured for use with a plurality of shafts, each shaft having an outside diameter within a range of values, the value of the outside diameter of each one of the plurality of shafts being different than the value of the outside diameter of each other one of the plurality of shafts.

16. The wear sleeve assembly as recited in claim 1 wherein the sleeve is fabricated of at least one of aluminum, a ceramic material, and a polymeric material.

17. The wear sleeve assembly as recited in claim 1 wherein the sleeve includes a generally tubular body having a wall thickness, the wall thickness having a value within a range of about twelve thousands of an inch and about one hundred twenty thousands of an inch.

18. A wear sleeve assembly of a seal for a shaft, the shaft having an outer surface and being rotatable about an axis, the seal including a seal member with an inner circumferential surface, the wear sleeve assembly comprising: a sleeve having inner and outer circumferential surfaces and two opposing axial ends, the sleeve outer surface being engageable by the seal inner circumferential surface at about a contact location with respect to the axis so as to substantially prevent fluid flow between the seal inner surface and sleeve outer surface, the sleeve inner surface defining a bore sized to receive a portion of the shaft with clearance; and a coupler configured to connect the sleeve with the shaft so as to provide a clearance space between the sleeve inner surface and the shaft outer surface at about the seal contact location such that the sleeve is adjustably positionable with respect to the shaft, the coupler being connected with the sleeve at a coupling location with respect to the central axis, the coupling location being spaced axially from the seal contact location such that the seal contact location is disposed generally between one of the two axial ends and the coupling location and the clearance space extends unobstructed axially from the one axial end to at least the coupling location, the coupler including a generally annular body with a first section including a bore configured to receive a portion of the shaft and a second section spaced axially from the first section and configured to engage with the sleeve, at least a portion of the coupler body being deflectable to displace the coupler second section relative to the coupler first section so as to displace the sleeve relative to the shaft.

\* \* \* \* \*